US011657068B2

(12) United States Patent
Crawford et al.

(10) Patent No.: US 11,657,068 B2
(45) Date of Patent: May 23, 2023

(54) EFFICIENT MIGRATION BETWEEN ASYNCHRONOUS DATA REPLICATION TECHNOLOGIES

(71) Applicant: International Business Machines Corporation, Armonk, NY (US)

(72) Inventors: Joshua J. Crawford, Tucson, AZ (US); Gregory E. McBride, Vail, AZ (US); Warren K. Stanley, Loveland, CO (US); Matthew J. Ward, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 627 days.

(21) Appl. No.: 15/842,887

(22) Filed: Dec. 15, 2017

(65) Prior Publication Data

US 2019/0188310 A1    Jun. 20, 2019

(51) Int. Cl.
*G06F 16/27* (2019.01)
*G06F 16/23* (2019.01)
*G06F 11/20* (2006.01)

(52) U.S. Cl.
CPC ........ *G06F 16/273* (2019.01); *G06F 11/2074* (2013.01); *G06F 11/2094* (2013.01); *G06F 16/2365* (2019.01); *G06F 2201/805* (2013.01); *G06F 2201/82* (2013.01); *G06F 2201/855* (2013.01)

(58) Field of Classification Search
CPC ............... G06F 16/273; G06F 16/2365; G06F 16/1844; G06F 16/635; G06F 16/639; G06F 16/9535

USPC .......................................... 707/610, 624, 613
See application file for complete search history.

(56) References Cited

U.S. PATENT DOCUMENTS

| 9,632,716 | B1 * | 4/2017 | Harris, Jr. ............. G06F 3/0683 |
| 9,959,063 | B1 * | 5/2018 | Meiri ..................... G06F 3/0683 |
| 10,481,826 | B2 * | 11/2019 | Vijayan ............... G06F 11/1464 |
| 2003/0033327 | A1 * | 2/2003 | Mandal ................... G06F 16/27 |

(Continued)

FOREIGN PATENT DOCUMENTS

CN        103777897 B      3/2017

*Primary Examiner* — Pierre M Vital
*Assistant Examiner* — Fariborz Khoshnoodi
(74) *Attorney, Agent, or Firm* — Nelson IP; Daniel P. Nelson

(57) ABSTRACT

A method for converting from one asynchronous data replication technology to another is disclosed herein. In one embodiment, such a method includes utilizing a first asynchronous data replication technology to asynchronously replicate data from a primary volume to a secondary volume. The method initiates, at time T1, tracking of post-T1 changes to the primary volume and waits for all pre-T1 changes to the primary volume to be propagated to the secondary volume. When all pre-T1 changes have been propagated to the secondary volume, the method suspends operation of the first asynchronous data replication technology and replicates all post-T1 changes from the primary volume to the secondary volume. The method further sets up and initiates a second asynchronous data replication technology to asynchronously replicate data from the primary volume to the secondary volume. A corresponding system and computer program product are also disclosed herein.

20 Claims, 7 Drawing Sheets

(56) References Cited

U.S. PATENT DOCUMENTS

| | | | | |
|---|---|---|---|---|
| 2003/0126200 | A1* | 7/2003 | Wolff | G06F 9/52 |
| | | | | 709/203 |
| 2005/0015663 | A1* | 1/2005 | Armangau | H04L 67/1095 |
| | | | | 714/15 |
| 2005/0055523 | A1* | 3/2005 | Suishu | G06F 11/2058 |
| | | | | 711/165 |
| 2005/0093881 | A1* | 5/2005 | Okita | G06Q 10/06 |
| | | | | 345/589 |
| 2005/0273565 | A1* | 12/2005 | Hirakawa | G06F 11/2058 |
| | | | | 711/162 |
| 2007/0006166 | A1* | 1/2007 | Daley | G06F 11/3644 |
| | | | | 717/129 |
| 2007/0250930 | A1* | 10/2007 | Aziz | G06F 9/45533 |
| | | | | 726/24 |
| 2008/0040790 | A1* | 2/2008 | Kuo | G06F 21/604 |
| | | | | 726/12 |
| 2009/0198949 | A1* | 8/2009 | Kuligowski | G06F 3/0605 |
| | | | | 711/203 |
| 2010/0205392 | A1* | 8/2010 | Schnapp | G06F 3/0665 |
| | | | | 711/162 |
| 2011/0106763 | A1* | 5/2011 | Madan | G06F 16/178 |
| | | | | 707/639 |
| 2014/0059308 | A1 | 2/2014 | Blea et al. | |
| 2015/0286538 | A1 | 10/2015 | Brown et al. | |
| 2015/0286545 | A1* | 10/2015 | Brown | G06F 11/2058 |
| | | | | 714/6.23 |
| 2015/0378767 | A1* | 12/2015 | Tarasuk-Levin | G06F 16/273 |
| | | | | 718/1 |

* cited by examiner

EFFICIENT MIGRATION BETWEEN ASYNCHRONOUS DATA REPLICATION TECHNOLOGIES

BACKGROUND

Field of the Invention

This invention relates to systems and methods for converting from one asynchronous data replication technology to another.

Background of the Invention

In asynchronous data replication environments such as z/OS Global Mirror (also referred to as "XRC") and Global Mirror, data is asynchronously mirrored from a primary storage device to a secondary storage device to maintain two consistent copies of the data. The primary and secondary storage devices may be located at different sites, perhaps hundreds or even thousands of miles away from one another. In the event an outage occurs at the primary site, host I/O may be redirected to the secondary storage device, thereby enabling continuous operations. When the outage is corrected or repaired at the primary site, host I/O may be redirected back to the primary storage device.

Global Mirror is a newer technology than XRC and differs in some important ways from XRC. For example, Global Mirror runs entirely within an enterprise storage system, such as the IBM DS8000™ enterprise storage system, and uses Global Copy®, FlashCopy®, and a data freeze technique to maintain data consistency. XRC uses a host software component referred to as System Data Mover (SDM) to move data from a primary storage device to a secondary storage device. XRC also requires a very accurate clock, referred to as a Sysplex Timer, to maintain data consistency and synchronize clocks of all member systems. XRC also does not support open systems. Users that have both mainframe and open systems often wish to use the same data replication technology for both.

For various reasons, namely the complexity of XRC, its lack of support for open systems, and the need for external software (i.e., the SDM) and a Sysplex Timer, users may wish to convert from XRC to Global Mirror. Under normal circumstances, such a conversion may require recopying data from a primary storage device to a secondary storage device. Such a process may be time-consuming and expensive since bandwidth resources between the primary and secondary storage devices may be limited/costly. In view of the foregoing, it would be desirable to develop techniques that enable this conversion to occur without having to fully copy data from a primary storage device to a secondary storage device.

SUMMARY

The invention has been developed in response to the present state of the art and, in particular, in response to the problems and needs in the art that have not yet been fully solved by currently available systems and methods. Accordingly, the invention has been developed to provide systems and methods for converting from one asynchronous data replication technology to another. The features and advantages of the invention will become more fully apparent from the following description and appended claims, or may be learned by practice of the invention as set forth hereinafter.

Consistent with the foregoing, a method for converting from one asynchronous data replication technology to another is disclosed herein. In one embodiment, such a method includes utilizing a first asynchronous data replication technology to asynchronously replicate data from a primary volume to a secondary volume. The method initiates, at time T1, tracking of post-T1 changes to the primary volume and waits for all pre-T1 changes to the primary volume to be propagated to the secondary volume. When all pre-T1 changes have been propagated to the secondary volume, the method suspends operation of the first asynchronous data replication technology and replicates all post-T1 changes from the primary volume to the secondary volume. The method further sets up and initiates a second asynchronous data replication technology to asynchronously replicate data from the primary volume to the secondary volume. The method then terminates the first asynchronous data replication technology.

A corresponding computer program product and system are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
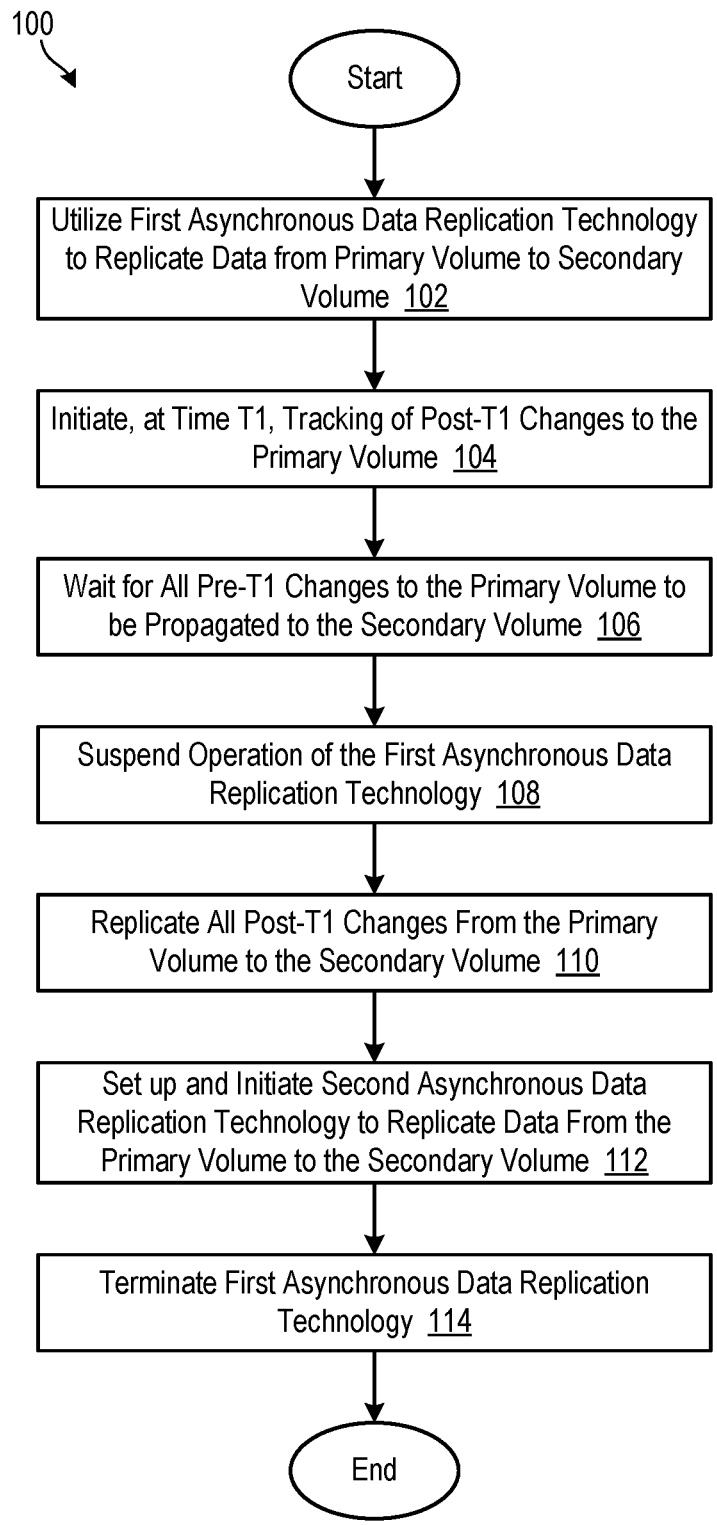
FIG. 1 is a flow diagram showing a broad method for converting from one asynchronous data replication technology to another.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Referring to FIG. 1, as previously mentioned, in asynchronous data replication environments such as z/OS Global Mirror (also referred to hereinafter as "XRC") and Global Mirror, data is mirrored from a primary storage device to a secondary storage device to maintain two consistent copies of the data. The primary and secondary storage devices may be located at different sites, perhaps hundreds or even thousands of miles away from one another. In the event an outage occurs at the primary site, host I/O may be redirected to the secondary storage device, thereby enabling continuous operations. When the outage is corrected or repaired at the primary site, host I/O may be redirected back to the primary storage device.

Global Mirror is a newer technology than XRC and differs in some important ways from XRC. For example, Global Mirror runs entirely within an enterprise storage system, such as the IBM DS8000™ enterprise storage system, and uses Global Copy®, FlashCopy®, and a data freeze technique to maintain data consistency. XRC, by contrast, uses a host software component called System Data Mover (SDM) to move data from a primary storage device to a secondary storage device. XRC requires a very accurate clock (i.e., a Sysplex Timer) to maintain data consistency and synchronize clocks of all member systems.

For various reasons, namely the complexity of XRC, its lack of support for open systems, and the need for external software (i.e., the SDM) and a Sysplex Timer, users may wish to convert their asynchronous data replication system from XRC to Global Mirror. Under normal circumstances, such a conversion requires recopying data from a primary storage device to a secondary storage device. This process may be time-consuming and expensive since bandwidth may be limited/costly between the primary and secondary storage devices. It would be desirable, therefore, to develop techniques that enable this conversion to occur without having to fully copy data from a primary storage device to a secondary storage device.

FIG. 1 is a flow diagram showing a broad method 100 for migrating from a first asynchronous data replication technology to a second asynchronous data replication technology. As shown, the method 100 utilizes 102 a first asynchronous data replication technology to replicate data from a primary volume to a secondary volume. The method 100 then initiates 104, at time T1, tracking of post-T1 changes to the primary volume. The method 100 waits 106 for all pre-T1 changes to the primary volume to be propagated to the secondary volume. When this is complete, the method 100 suspends 108 operation of the first asynchronous data replication technology. This will suspend asynchronous mirroring of data from the primary volume to the secondary volume.

At this point, the method 100 may replicate all post-T1 changes from the primary volume to the secondary volume. The method 100 may then set up 112 and initiate 112 a second asynchronous data replication technology to replicate data from the primary volume to the secondary volume. At this point, the method 100 may terminate 114 the first asynchronous data replication technology. This will complete the migration from the first asynchronous data replication technology to the second asynchronous data replication technology.

Figure 2:
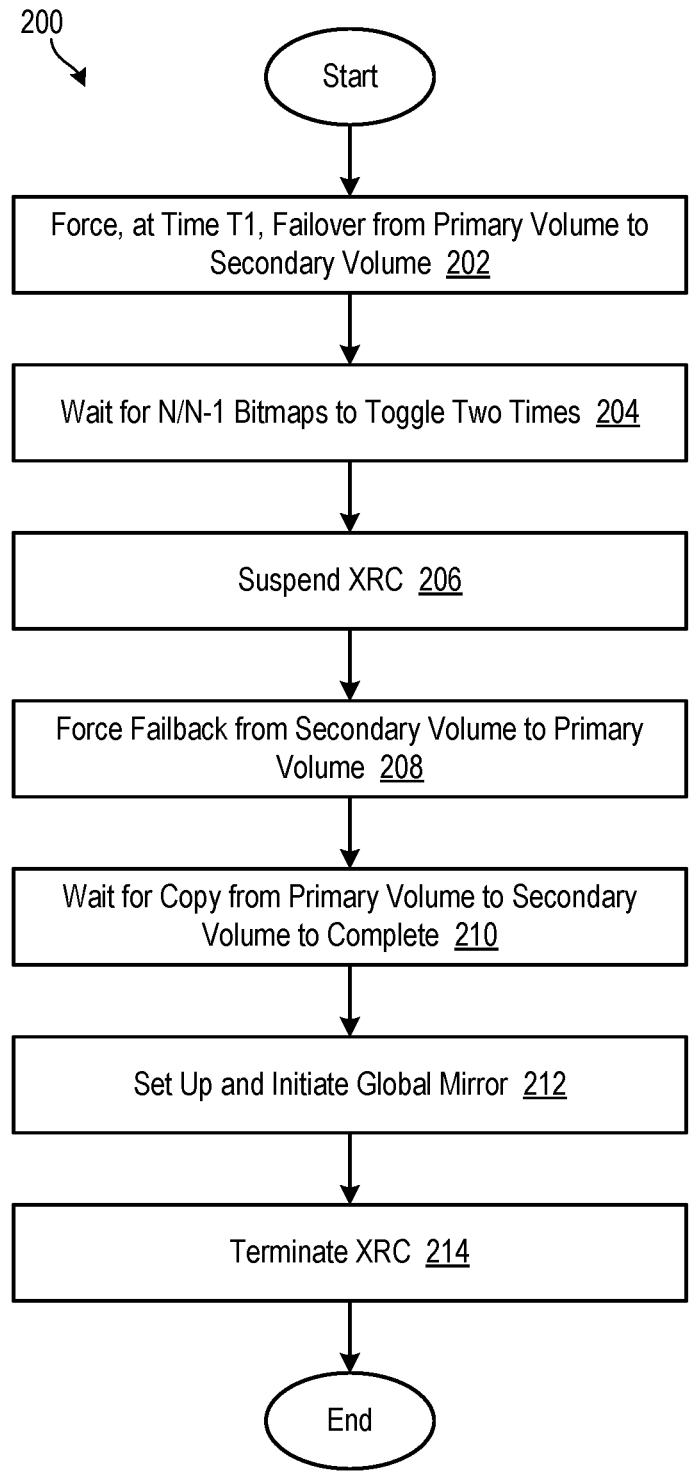
FIG. 2 is a flow diagram showing a more particular method for converting from z/OS Global Mirror ("XRC") to Global Mirror.

Referring to FIG. 2, a flow diagram showing a more particular method 200 for migrating from z/OS Global Mirror ("XRC") to Global Mirror is illustrated. This method 200 generally conforms to the broader method 100 illustrated in FIG. 2, although more detail is provided for XRC and Global Mirror.

As shown, the method 200 initially forces 202, at time T1 in the XRC environment, a failover from a primary volume to a secondary volume. This will initiate an out-of-sync bitmap on the primary storage device 304a that will record changes to the primary volume (e.g., writes from a host system to the primary volume) that occur after time T1. This "forced failover" creates a primary suspended relationship. Specifically, the "forced failover" establishes a new pair in a suspended state and starts change recording with the out-of-sync bitmap.

While changes are being recorded in the out-of-sync bitmap, XRC will continue to mirror updates from the primary volume to the secondary volume. During this mirroring, a pair of bitmaps (referred to herein as an "N" bitmap and "N−1" bitmap) may be used to track which data needs to be replicated from the primary volume to the secondary volume. In general, a System Data Mover (SDM) associated with XRC may determine when it has replicated all data indicated in the "N" bitmap. Once this has occurred, the System Data Mover may switch to the "N−1" bitmap and determine when it has replicated all data indicated in the "N−1" bitmap. In essence, the "N−1" bitmap becomes the new "N" bitmap and the previous "N" bitmap is discarded. Each time the System Data Mover switches from the "N" bitmap to the "N−1" bitmap, this is referred to as a "toggle" for the purposes of this disclosure. Once two toggles have occurred subsequent to the forced failover at step 204, one can be assured that all updates that occurred to the primary volume prior to the forced failover have been replicated to the secondary volume. In certain embodiments, a "Query 22," which returns a last toggle time as well as a current controller time, may be used to determine when a "toggle" has occurred.

Once two "toggles" have occurred, the method 200 suspends 206 XRC. This will cause XRC to cease mirroring data from the primary volume to the secondary volume. At this point, the method 200 forces 208 a failback from the primary volume to the secondary volume. This will cause XRC (and more particularly Peer-to-Peer Remote Copy (PPRC), which is a mirroring mechanism underlying XRC) to copy, from the primary volume to the secondary volume, all updates that are recorded in the out-of-sync bitmap established at step 202. The method 200 waits 210 for all data recorded in the out-of-sync bitmap to be copied from the primary volume to the secondary volume.

After all data has been copied, the method 200 sets up 212 and initiate 212 the Global Mirror asynchronous data replication technology. This may include setting up point-in-time copy technology such as FlashCopy at the secondary site, as well as setting up session information, establishing which volumes are part of consistency groups, establishing master processes that are charged with forming consistency groups, and the like. Once Global Mirror is set up and properly configured, the method 200 initiates 212 Global Mirror. At this point, data is being mirrored from the primary volume to the secondary volume in response to the forced failback described above. Once Global Mirror is set up and running, the method 200 terminates 214 the XRC asynchronous data replication technology. This will complete the migration from XRC to Global Mirror.

Figure 3:
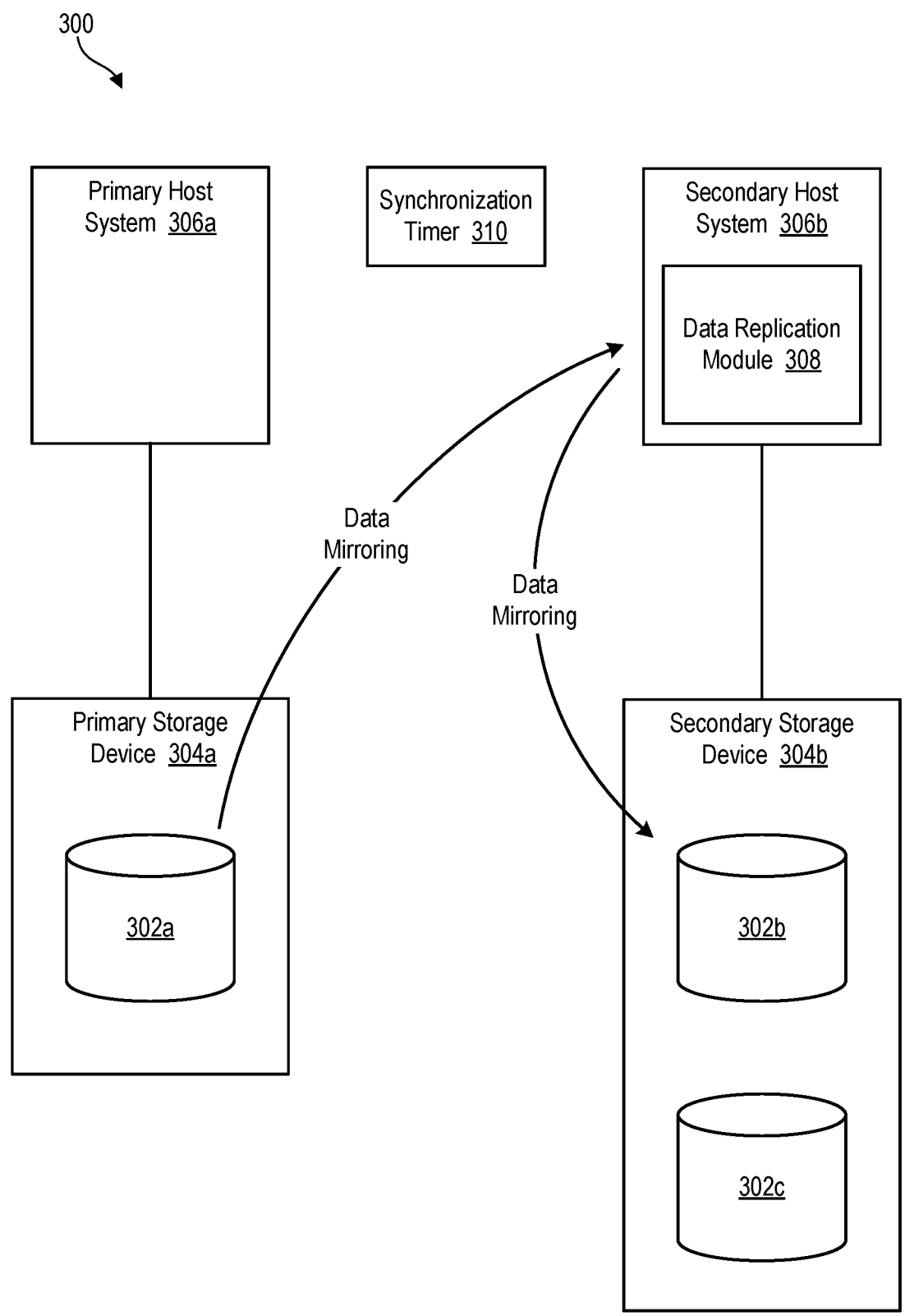
FIG. 3 is a high-level block diagram showing XRC prior to migration to Global Mirror.
Figure 4:
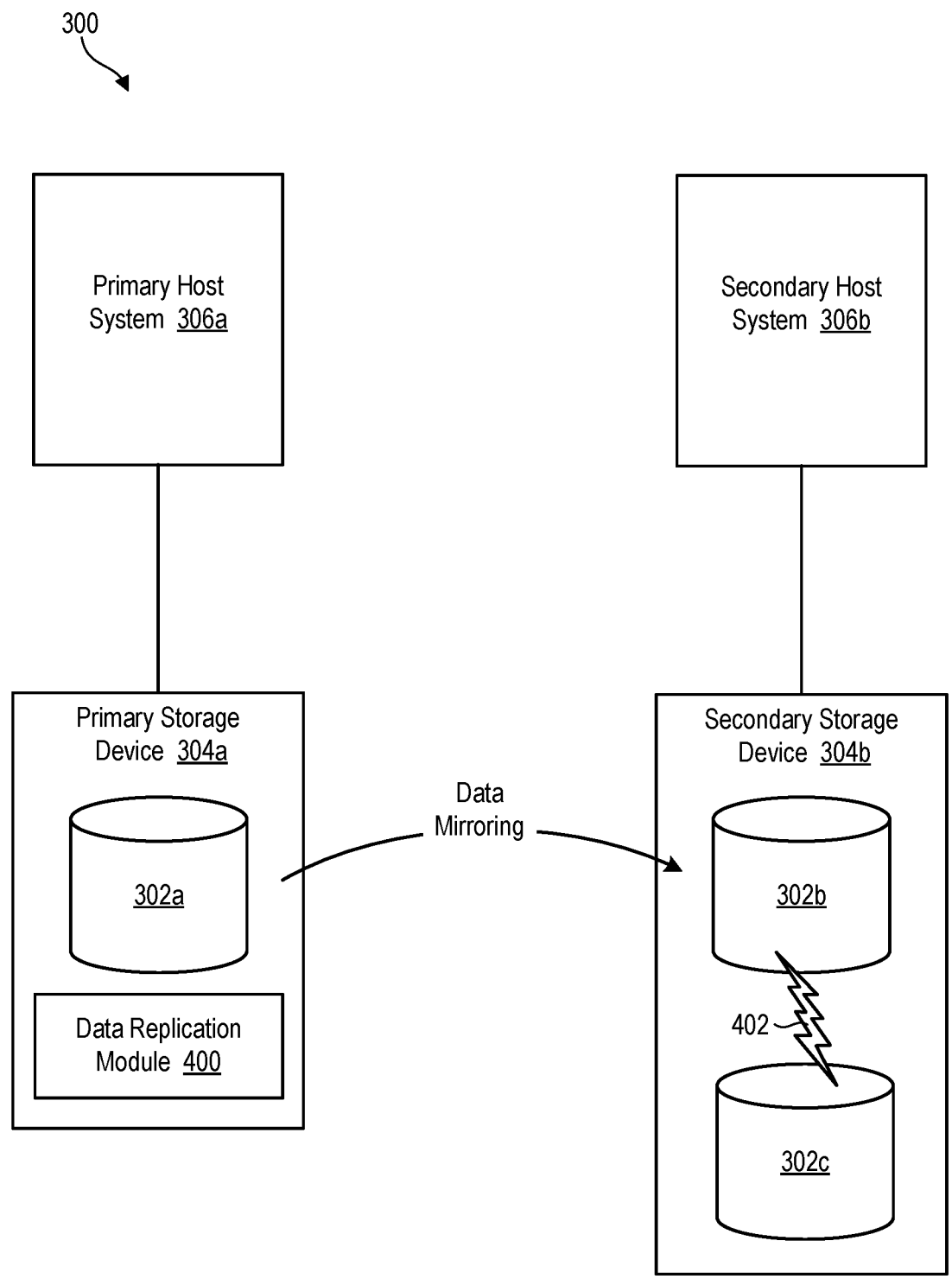
FIG. 4 is a high-level block diagram showing Global Mirror after migration from XRC.

FIG. 3 shows the asynchronous data replication system 300 prior to migration to Global Mirror, and FIG. 4 shows the asynchronous data replication system 300 after migration to Global Mirror. As shown in FIG. 3, prior to migration to Global Mirror, XRC replicates data from a primary volume 302a to a secondary volume 302b using a data replication module 308 (i.e., the System Data Mover) located on a host system, in this example the secondary host system 306b. As shown, the data replication module 308 reads data from the primary volume 302a and writes it to the secondary volume 302b to maintain two consistent copies of the data. A synchronization timer 310 (e.g., a Sysplex Timer) may be used to maintain data consistency and synchronize clocks of the various systems 304a, 304b, 306a, 306b. While XRC continues to operate, a tertiary volume 302c may be created, possibly on the same secondary storage device 304b as the secondary volume 302b, in preparation to transition to Global Mirror.

FIG. 4 is a high-level block diagram showing the asynchronous data replication system 300 after migration to Global Mirror. After migrating to Global Mirror, functionality (referred to herein as a data replication module 400) within the primary storage device 304a may be used to directly mirror data from the primary volume 302a to the secondary volume 302b. At the secondary storage device 304b, a point-in-time copy feature 402 such as FlashCopy may be used to periodically take snapshots of data in the secondary volume 302b and store the snapshots in the tertiary volume 302c (also called a journal volume 302c). In certain embodiments, the tertiary volume 302c is a thin-provisioned volume to save storage space.

Figure 5:
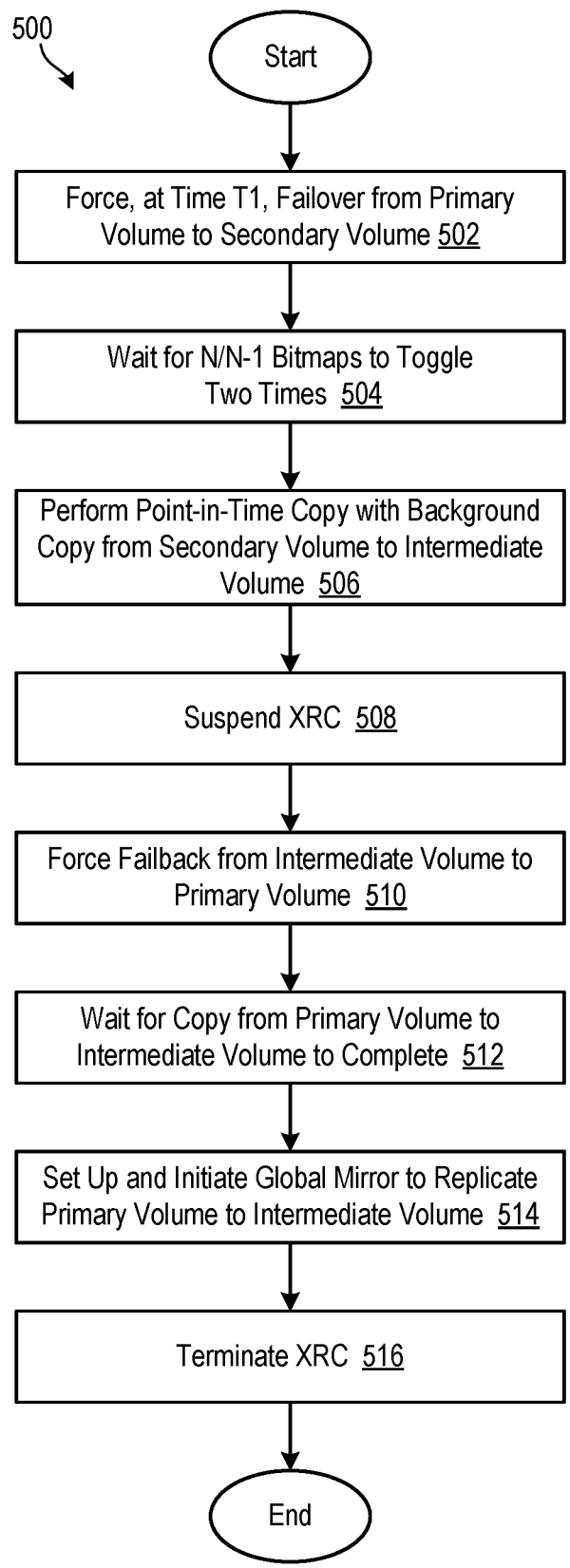
FIG. 5 is a flow diagram showing a method for migrating from z/OS Global Mirror ("XRC") with Practice Copy to Global Mirror with Practice Copy.

Referring to FIG. 5, in certain embodiments, a user may want, at a secondary site, a copy or snapshot of data on which the user can perform testing, such as disaster recovery or development testing. This copy will be referred to as a "Practice Copy" hereinafter. FIG. 5 is a flow diagram showing a method 500 for migrating from z/OS Global Mirror ("XRC") with a Practice Copy, to Global Mirror with a Practice Copy.

As shown, the method 500 initially forces 502, at time T1, a failover from the primary volume 302a to the secondary volume 302b. This will create an out-of-sync bitmap on the primary storage device 304a to record changes to the primary volume (e.g., writes from a host system to the primary volume) occurring after time T1. While changes are recorded in the out-of-sync bitmap, XRC continues to mirror updates from the primary volume 302a to the secondary volume 302b. After the failover is forced at time T1, the method 500 waits 504 for two "toggles" to occur in association with the N/N−1 bitmaps previous discussed. Once two toggles have occurred, all updates that were made to the primary volume 302a prior to the forced failover will have been replicated to the secondary volume 302b.

Figure 6:
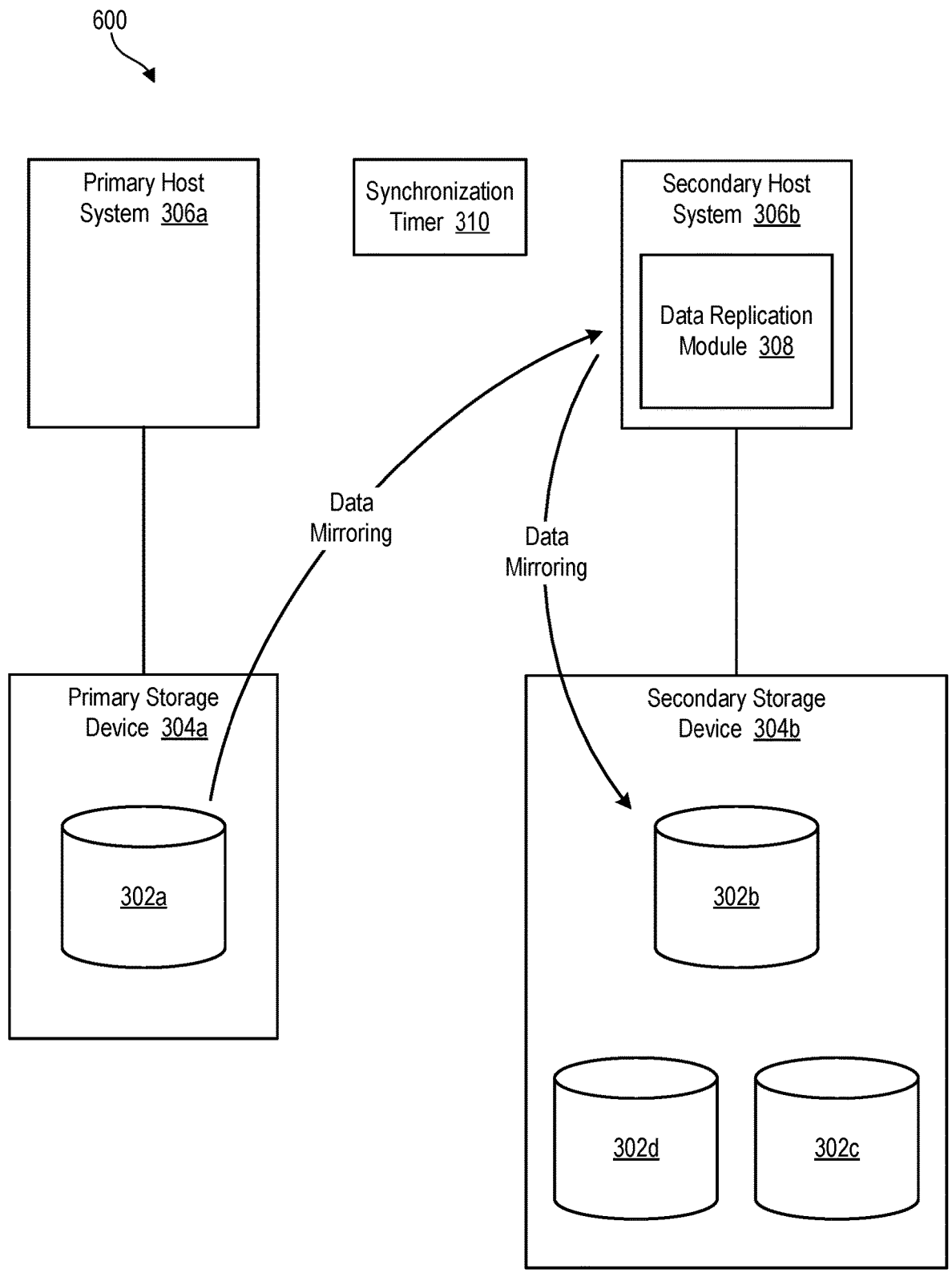
FIG. 6 is a high-level block diagram showing XRC with Practice Copy prior to migration to Global Mirror with Practice Copy.

Once two "toggles" have occurred, the method 500 performs 506 a point-in-time copy with background copy from the secondary volume 302b to an intermediate volume 302d (as shown in FIG. 6), using a feature such as FlashCopy. At this point, the method 500 suspends 508 XRC. This will stop XRC from mirroring data from the primary volume 302a to the secondary volume 302b. The method 500 then forces 510 a failback from the primary volume 302d to the intermediate volume 302a. This will cause XRC (and more particularly PPRC) to copy, from the primary volume 302a to the intermediate volume 302d, all updates that were recorded in the out-of-sync bitmap established at step 502. The method 500 then waits 512 for all data recorded in the out-of-sync bitmap to be copied from the primary volume 302a to the intermediate volume 302d.

After all data has been copied to the intermediate volume 302d, the method 500 sets up 514 and initiates 514 the Global Mirror asynchronous data replication technology. This may include setting up point-in-time copy technology such as FlashCopy at the secondary site to periodically capture snapshots of the intermediate volume 302d in volumes 302b, 302c, as well as setting up session information, establishing which volumes are part of consistency groups, establishing master processes that are in charge of forming consistency groups, and the like. The secondary volume 302b may store the "Practice Copy" of data in the intermediate volume 302d and the tertiary volume 302c may act as a journal to store more frequent snapshots of data in the intermediate volume 302d. Once Global Mirror is set up and properly configured, the method 500 initiates 514 Global Mirror. At this point, data is being mirrored from the primary volume to the secondary volume in response to the forced failback described above. Once Global Mirror is set up and running, the method 500 terminates 516 the XRC asynchronous data replication technology. This will complete the migration from XRC to Global Mirror.

Figure 7:
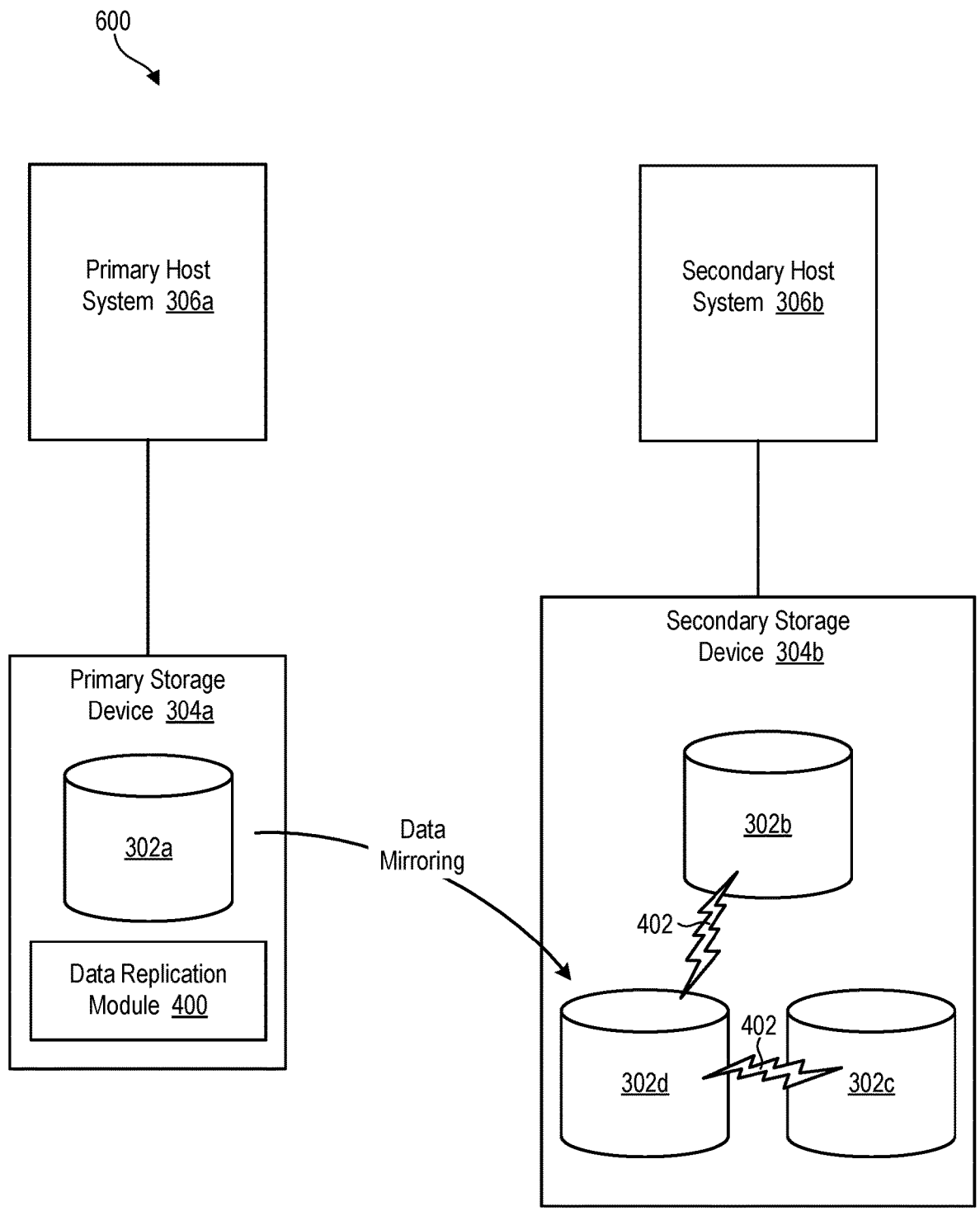
FIG. 7 is a high-level block diagram showing Global Mirror with Practice Copy after migration from XRC with Practice Copy.

FIG. 6 shows the asynchronous data replication system 600 prior to the migration to Global Mirror with Practice Copy, and FIG. 7 shows the asynchronous data replication system 300 after the migration to Global Mirror with Practice Copy. As shown in FIG. 6, prior to the migration to Global Mirror with Practice Copy, XRC replicates data from a primary volume 302a to a secondary volume 302b using a data replication module 308 (i.e., the System Data Mover) located on a host system, in this example the secondary host system 306b. As shown, the data replication module 308 reads data from the primary volume 302a and writes it to the secondary volume 302b. The secondary volume 302b may be considered a "Practice Copy," which may used for testing such as disaster recovery or development testing. A synchronization timer 310 (e.g., a Sysplex Timer) may be used to maintain data consistency and synchronize clocks of the various systems 304a, 304b, 306a, 306b. While XRC continues to operate, an intermediate volume 302d and tertiary volume 302c may be created, possibly on the same secondary storage device 304b as the secondary volume 302b, in preparation to transition to Global Mirror.

FIG. 7 is a high-level block diagram showing the asynchronous data replication system 600 after migration to Global Mirror with Practice Copy. After migrating to Global Mirror with Practice Copy, functionality (referred to herein as a data replication module 400) within the primary storage device 304a may be used to directly mirror data from the primary volume 302a to the intermediate volume 302d. A point-in-time copy feature 402 such as FlashCopy may be used to periodically take snapshots of data in the intermediate volume 302d and store the snapshots in a tertiary volume 302c (also called a journal volume 302c), possibly on the same secondary storage device 304b as the secondary volume 302b. The point-in-time copy feature 402 may also be used to periodically, or at the prompting of a user, take a snapshot of the intermediate volume 302d and store it in the secondary volume 302b. This snapshot may be used as a Practice Copy for testing or development purposes.

The flowcharts and block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for migrating from a first asynchronous data replication technology to a second asynchronous data replication technology, the method comprising;
   utilizing a host-based software component to asynchronously replicate data from a primary volume to a secondary volume, the host-based software component executing on a host system;
   initiating, at time T1, tracking of post-T1 changes to the primary volume;
   waiting for all pre-T1 changes to the primary volume to be propagated to the secondary volume;
   when all pre-T1 changes have been propagated to the secondary volume, suspending operation of the host-based software component;
   replicating all post-T1 changes from the primary volume to the secondary volume;
   utilizing an enterprise-storage-system-based software component to asynchronously replicate data from the primary volume to the secondary volume without assistance from the host-based software component, the enterprise-storage-system-based software component executing on an enterprise storage system, the enterprise storage system having different hardware and functionality than the host system; and terminating utilization of the host-based software component to asynchronously replicate data from the primary volume to the secondary volume.

2. The method of claim 1, wherein tracking of post-T1 changes comprises tracking the post-T1 changes using an out-of-sync bitmap.

3. The method of claim 1, wherein waiting for all pre-T1 changes to be propagated to the secondary volume comprises waiting for at least two toggles of N/N−1 bitmaps since time T1.

4. The method of claim 1, wherein initiating tracking of post-T1 changes is accomplished by forcing a failover from the primary volume to the secondary volume.

5. The method of claim 1, wherein replicating all post-T1 changes from the primary volume to the secondary volume is accomplished by forcing a failback from the primary volume to the secondary volume.

6. The method of claim 1, wherein utilizing the host-based software component comprises utilizing z/OS Global Mirror (XRC) to asynchronously replicate data from the primary volume to the secondary volume.

7. The method of claim 1, wherein utilizing the enterprise-storage-system-based software component comprises utilizing Global Mirror to asynchronously replicate data from the primary volume to the secondary volume.

8. A computer program product for migrating from a first asynchronous data replication technology to a second asynchronous data replication technology, the computer program product comprising a non-transitory computer-readable storage medium having computer-usable program code embodied therein, the computer-usable program code configured to perform the following when executed by at least one processor:

utilize a host-based software component to asynchronously replicate data from a primary volume to a secondary volume, the host-based software component executing on a host system;

initiate, at time T1, tracking of post-T1 changes to the primary volume;

wait for all pre-T1 changes to the primary volume to be propagated to the secondary volume;

when all pre-T1 changes have been propagated to the secondary volume, suspend operation of the host-based software component;

replicate all post-T1 changes from the primary volume to the secondary volume;

utilize an enterprise-storage-system-based software component to asynchronously replicate data from the primary volume to the secondary volume without assistance from the host-based software component, the enterprise-storage-system-based software component executing on an enterprise storage system, the enterprise storage system having different hardware and functionality than the host system; and terminate utilization of the host-based software component to asynchronously replicate data from the primary volume to the secondary volume.

9. The computer program product of claim 8, wherein tracking of post-T1 changes comprises tracking the post-T1 changes using an out-of-sync bitmap.

10. The computer program product of claim 8, wherein waiting for all pre-T1 changes to be propagated to the secondary volume comprises waiting for at least two toggles of N/N−1 bitmaps since time T1.

11. The computer program product of claim 8, wherein initiating tracking of post-T1 changes is accomplished by forcing a failover from the primary volume to the secondary volume.

12. The computer program product of claim 8, wherein replicating all post-T1 changes from the primary volume to the secondary volume is accomplished by forcing a failback from the primary volume to the secondary volume.

13. The computer program product of claim 8, wherein utilizing the host-based software component comprises utilizing z/OS Global Mirror (XRC) to asynchronously replicate data from the primary volume to the secondary volume.

14. The computer program product of claim 8, wherein utilizing the enterprise-storage-system-based software component comprises utilizing Global Mirror to asynchronously replicate data from the primary volume to the secondary volume.

15. A system for migrating from a first asynchronous data replication technology to a second asynchronous data replication technology, the system comprising:

at least one processor;

at least one memory device operably coupled to the at least one processor and storing instructions for execution on the at least one processor, the instructions causing the at least one processor to:

utilize a host-based software component to asynchronously replicate data from a primary volume to a secondary volume, the host-based software component executing on a host system;

initiate, at time T1, tracking of post-T1 changes to the primary volume;

wait for all pre-T1 changes to the primary volume to be propagated to the secondary volume;

when all pre-T1 changes have been propagated to the secondary volume, suspend operation of the host-based software component;

replicate all post-T1 changes from the primary volume to the secondary volume;

utilize an enterprise-storage-system-based software component to asynchronously replicate data from the primary volume to the secondary volume without assistance from the host-based software component, the enterprise-storage-system-based software component executing on an enterprise storage system, the enterprise storage system having different hardware and functionality than the host system; and terminate utilization of the host-based software component to asynchronously replicate data from the primary volume to the secondary volume.

16. The system of claim 15, wherein tracking of post-T1 changes comprises tracking the post-T1 changes using an out-of-sync bitmap.

17. The system of claim 15, wherein waiting for all pre-T1 changes to be propagated to the secondary volume comprises waiting for at least two toggles of N/N−1 bitmaps since time T1.

18. The system of claim 15, wherein initiating tracking of post-T1 changes is accomplished by forcing a failover from the primary volume to the secondary volume.

19. The system of claim 15, wherein replicating all post-T1 changes from the primary volume to the secondary volume is accomplished by forcing a failback from the primary volume to the secondary volume.

20. The system of claim 15, wherein utilizing the host-based software component comprises utilizing z/OS Global Mirror (XRC) to asynchronously replicate data from the primary volume to the secondary volume, and utilizing the enterprise-storage-system-based software component comprises utilizing Global Mirror to asynchronously replicate data from the primary volume to the secondary volume.

* * * * *